United States Patent
Baek et al.

(10) Patent No.: US 9,249,027 B2
(45) Date of Patent: Feb. 2, 2016

(54) APPARATUS AND METHOD FOR EXFOLIATION OF GRAPHENE

(71) Applicant: UNIST-Academy Industry Research Corporation, Ulsan (KR)

(72) Inventors: Jong Beom Baek, Ulsan (KR); In Yup Jeon, Chungcheongbuk-do (KR)

(73) Assignee: UNIST-ACADEMY INDUSTRY RESEARCH CORPORATION, Ulsan (KR)

( * ) Notice: Subject to any disclaimer, the term of this patent is extended or adjusted under 35 U.S.C. 154(b) by 197 days.

(21) Appl. No.: 13/843,964

(22) Filed: Mar. 15, 2013

(65) Prior Publication Data

US 2013/0266503 A1    Oct. 10, 2013

(30) Foreign Application Priority Data

Apr. 10, 2012    (KR) .................. 10-2012-0037463

(51) Int. Cl.
*C01B 31/04*    (2006.01)
*B23Q 1/03*    (2006.01)
*B82Y 30/00*    (2011.01)
*B82Y 40/00*    (2011.01)

(52) U.S. Cl.
CPC .............. *C01B 31/0469* (2013.01); *B23Q 1/03* (2013.01); *B82Y 30/00* (2013.01); *B82Y 40/00* (2013.01); *Y10T 29/49998* (2015.01)

(58) Field of Classification Search
CPC .... C01B 31/0469; B82Y 40/00; B82Y 30/00; B23Q 1/03; Y10T 29/49998

USPC .............................. 423/448; 269/287; 29/559
See application file for complete search history.

(56) References Cited

U.S. PATENT DOCUMENTS

| | | | | |
|---|---|---|---|---|
| 576,762 A | * | 2/1897 | Palmer | .......................... 239/396 |
| 2010/0222482 A1 | * | 9/2010 | Jang et al. | ..................... 524/424 |
| 2013/0018204 A1 | | 1/2013 | Jeon et al. | |

FOREIGN PATENT DOCUMENTS

KR    10201169886    1/2013

* cited by examiner

*Primary Examiner* — Daniel C McCracken
(74) *Attorney, Agent, or Firm* — John B. Hardaway, III; Nexsen Pruet, LLC

(57) ABSTRACT

Provided is an apparatus and method for exfoliation of graphene, comprising a chamber which has a through-hole formed at one surface thereof; a cylinder which receives graphite and a volatile material to be vaporized at room temperature and has an opening to be corresponding to the through-hole of the chamber, and which is disposed at an outside of the chamber; a clamp which is disposed in the chamber to pass through the through-hole of the chamber and thus selectively seal the opening of the cylinder; and an operation mechanism which is connected with the clamp and moves the clamp so that the opening of the cylinder is selectively sealed by the clamp. Therefore, it is not necessary to use an acid like sulfuric acid, and it is also not necessary to perform a thermal treatment process for removing sulfuric acid.

8 Claims, 5 Drawing Sheets

APPARATUS AND METHOD FOR EXFOLIATION OF GRAPHENE

CROSS-REFERENCE(S) TO RELATED APPLICATIONS

The present invention claims priority of Korean Patent Application No. 10-2012-0037463, filed on Apr. 10, 2012, which is incorporated herein by reference.

BACKGROUND OF THE INVENTION

1. Field of the Invention

The present invention relates to an apparatus and method for exfoliation of graphene, and more particularly to an apparatus and method for exfoliation of graphene, in which graphene can be prepared by expanding graphite without a chemical treatment process using a strong acid like sulfuric acid and a thermal treatment process at a high temperature.

2. Description of Related Art

In general, graphite is a stack of two-dimensional graphene sheets having a layer structure in which carbon atoms are linked to one another in a hexagonal shape. Graphene is a representative flat single layer sheet in which three carbon atoms linked by an sp2 hybrid orbital bond are packed in a honeycomb crystal lattice.

In graphite, the carbon atoms in graphene are strongly linked to each other by a covalent bond, but graphenes are linked by a van-der-waals bond which is much weaker than the covalent bond.

Graphene is a single layer of graphite that is a (0001) plane of graphite. In graphite, since the bond between graphenes is weak, as described above, graphene has a very thin two-dimensional structure having a thickness of about 4 Å.

It has been found recently that graphene has very useful properties which are different from those of existing materials.

The most noteworthy property is that when electrons move in graphene, the electrons move as if the mass of the electrons is zero. This means that the electrons move at a speed at which light travels in vacuum, i.e., the speed of light. Further, another property is that graphene exhibits an abnormal half-integer quantum hall effect with respect to electrons and holes.

Moreover, the electron mobility of graphene known until the present is as high as about 20,000 to 50,000 $cm^2/Vs$. Above all things, in case of carbon nanotubes which are similar to graphene, since production yield is very low if they undergo refinement after synthesis, the price of final product is too high even though the synthesis is performed by using a cheap material, but in case of graphite, it has an advantage in that the price thereof is very low. And in case of single-wall carbon nanotubes, the metallic and semiconductor properties vary according to chirality and diameter thereof, and also even if the semiconductor property is same, all of band-gaps thereof are different from one another. Therefore, each of the single-wall carbon nanotubes should undergo separation, which is difficult, in order to use a particular semiconductor property and a particular metallic property thereof.

On the other hand, in case of graphene, since the electrical properties thereof vary according to the crystalline directivity of graphene having a given thickness, a user can provide an electrical property in a direction which the user elects, and thus can easily design a device. Such electrical properties of graphene can be effectively used in carbon-based electric or electromagnetic devices and the like.

Due to such excellent properties of graphene, graphene receives attention as a substitute for next generation silicon and ITO (Indium Tin Oxide) transparent electrode and the like.

Many methods of manufacturing graphene have been continuously reported since 2004. Among them, there has been a method in which strong sulfuric acid or dangerous ClF3 is filled between layers of graphite and then treated at a high temperature so as to expand the graphite.

In this method, after a space between graphenes is expanded by pressure generated when volatile molecules such as sulfuric acid filled between graphenes, a thermal treatment process at a high temperature (of about 1,000° C.) has to be performed to remove various hydrophilic functional groups existing on the surface of graphite.

However, in this method, since a strong acid like sulfuric acid should be used and the thermal treatment process at a high temperature should be also performed, there is a problem that the above-mentioned excellent properties of graphene are deteriorated when graphite is exfoliated into graphene.

Moreover, when disposing of used sulfuric acid, environmental problems may be occurred, and the manufacturing cost thereof is increased due to the complicated thermal treatment process.

SUMMARY OF THE INVENTION

An embodiment of the present invention is directed to providing an apparatus and method for exfoliation of graphene, in which graphene can be manufactured by expanding graphite without a chemical treatment process using a strong acid like sulfuric acid and a thermal treatment process at a high temperature.

To achieve the object of the present invention, the present invention provides an apparatus for exfoliation of graphene, including a chamber which has a through-hole formed at one surface thereof; a cylinder which receives graphite and a volatile material to be vaporized at room temperature and has an opening to be corresponding to the through-hole of the chamber, and which is disposed at an outside of the chamber; a clamp which is disposed in the chamber to pass through the through-hole of the chamber and thus selectively seal the opening of the cylinder; and an operation mechanism which is connected with the clamp and moves the clamp so that the opening of the cylinder is selectively sealed by the clamp.

Preferably, the operation mechanism comprises an operation lever which is installed at an outside of the chamber, and a link member which is connected between the operation lever and the clamp in the chamber so as to move the clamp through operation of the operation lever.

Preferably, the cylinder is vertically installed on an upper surface of the chamber, and the clamp is interlocked with the link member and moved vertically through operation of the operation lever.

Preferably, a jig enclosing the through-hole is provided at an outside of the chamber, and the cylinder is laterally slid and fixed to the jig.

Preferably, the cylinder has an installation hole formed at an end thereof opposed to an end having the opening, and a pressure gauge for measuring the internal pressure of the cylinder is installed in the installation hole.

Preferably, a seal packing is provided around the opening of the cylinder.

Preferably, the volatile material is liquid nitrogen, liquid oxygen, solid carbon dioxide (dry ice) or liquid carbon dioxide.

Further, the present invention provides an apparatus for exfoliation of graphene, including a chamber which has a through-hole formed at one surface thereof; a cylinder which receives graphite and a material having a boiling point of 200° C. or less and has an opening to be corresponding to the through-hole of the chamber, and which is disposed at an outside of the chamber; a clamp which is disposed in the chamber to pass through the through-hole of the chamber and thus selectively seal the opening of the cylinder; an operation mechanism which is connected with the clamp and moves the clamp so that the opening of the cylinder is selectively sealed by the clamp; and a heating unit which heats the cylinder.

Preferably, the material having a boiling point of 200° C. or less is water, methanol, ethanol, isopropyl alcohol, acetone, tetrahydrofuran, dimethylacetamide, dimethylformamide, normal hexane, cyclohexane, heptanes, toluene, benzene, ethyl acetate or a mixture thereof.

Further, the present invention provides a method for exfoliation of graphene, including a) filling a predetermined amount of graphite and a volatile material to be vaporized at room temperature in a cylinder, and installing the cylinder at a chamber; b) sealing the cylinder by moving a clamp; and c) moving the clamp and releasing an internal pressure of the cylinder when the internal pressure of the cylinder is more than a predetermined value due to vaporization of the volatile material.

Preferably, the method further includes heating the cylinder after the b) step.

Preferably, in the c) step, the predetermined value is 10 bar or more.

Preferably, in the c) step, the clamp is spaced apart from the cylinder by interlocking between an operation lever and a link member, and thus the internal pressure of the cylinder is released.

[Detailed Description of Main Elements]

| | |
|---|---|
| 110: chamber | 111: supporting leg |
| 112: through-hole | 113: fixing bracket |
| 120: cylinder | 121: opening |
| 122: cover | 123: flange |
| 124: installation hole | 125: seal packing |
| 130: clamp | 140: operation lever |
| 150: link member | 151: first link |
| 152: second link | 160: jig |
| 170: heating unit | |

DESCRIPTION OF SPECIFIC EMBODIMENTS

The advantages, features and aspects of the invention will become apparent from the following description of the embodiments with reference to the accompanying drawings, which is set forth hereinafter. The terms used herein are defined considering the function of each construction element, and thus the present invention is not limited to them.

Figure 1:
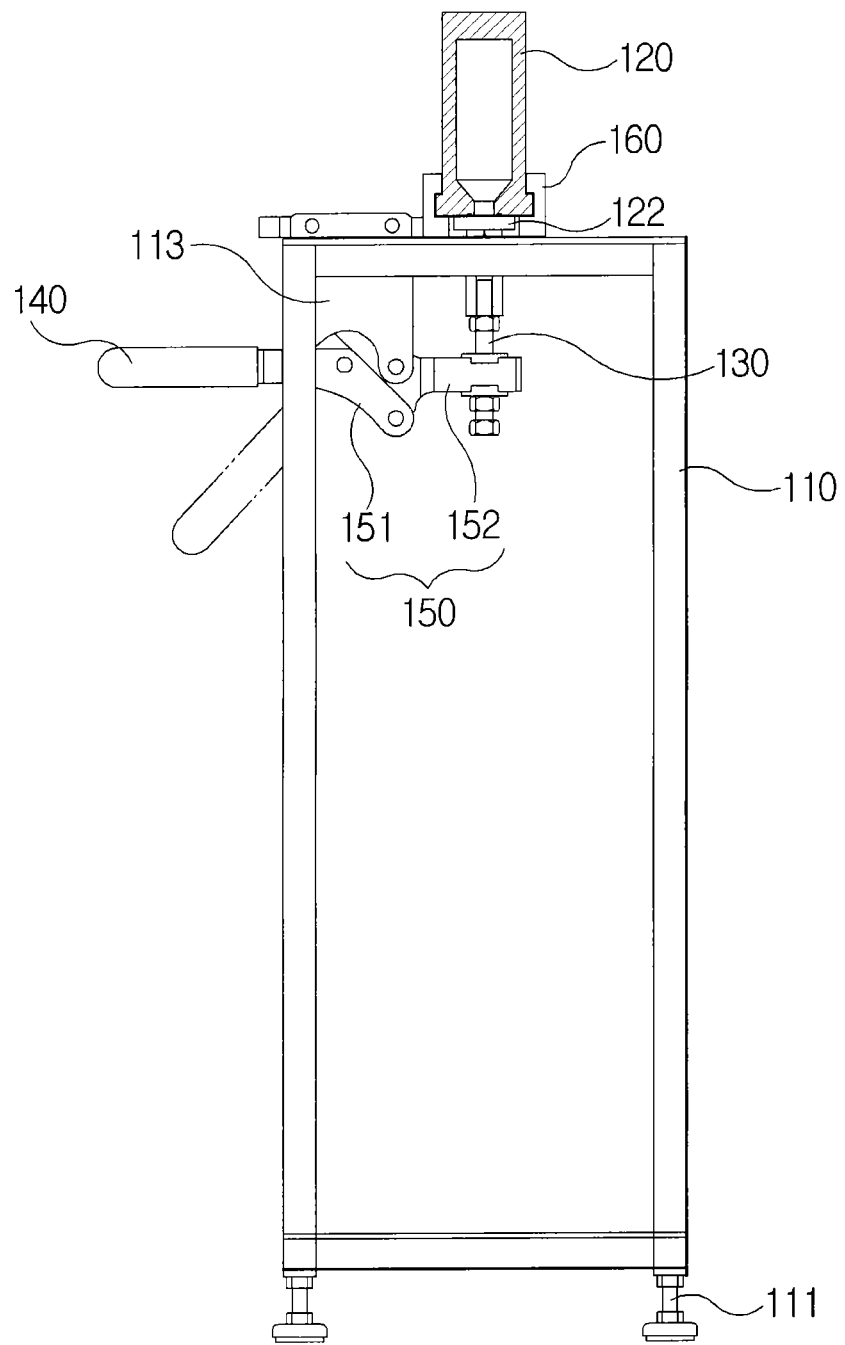
FIG. 1 is a side cross-sectional view of an apparatus for exfoliation of graphene according to an embodiment of the present invention.
Figure 2:
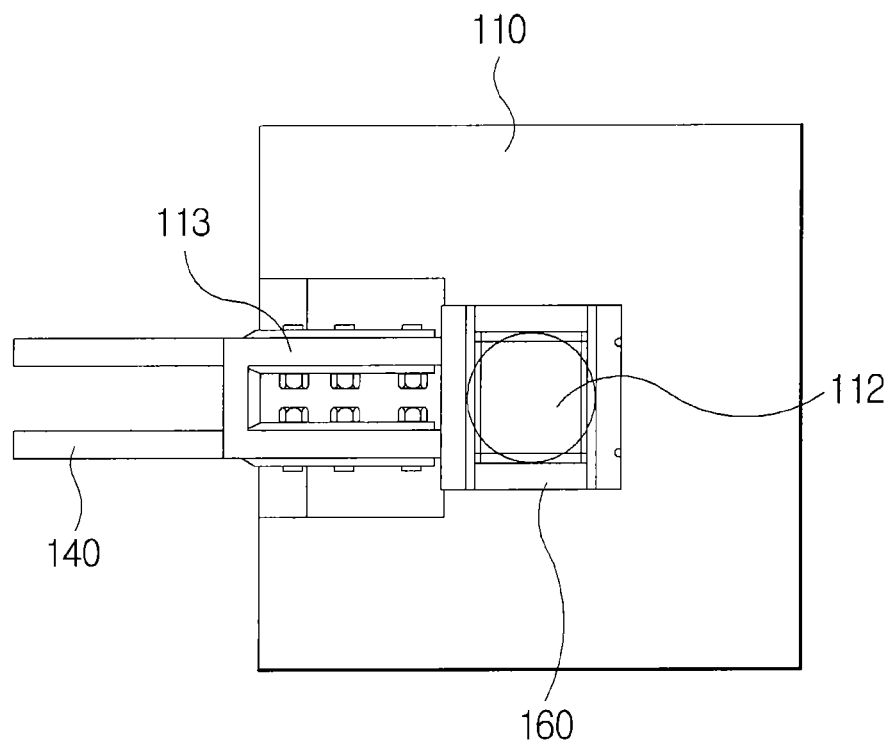
FIG. 2 is a plane view of the apparatus for exfoliation of graphene according to the present invention.
Figure 3:
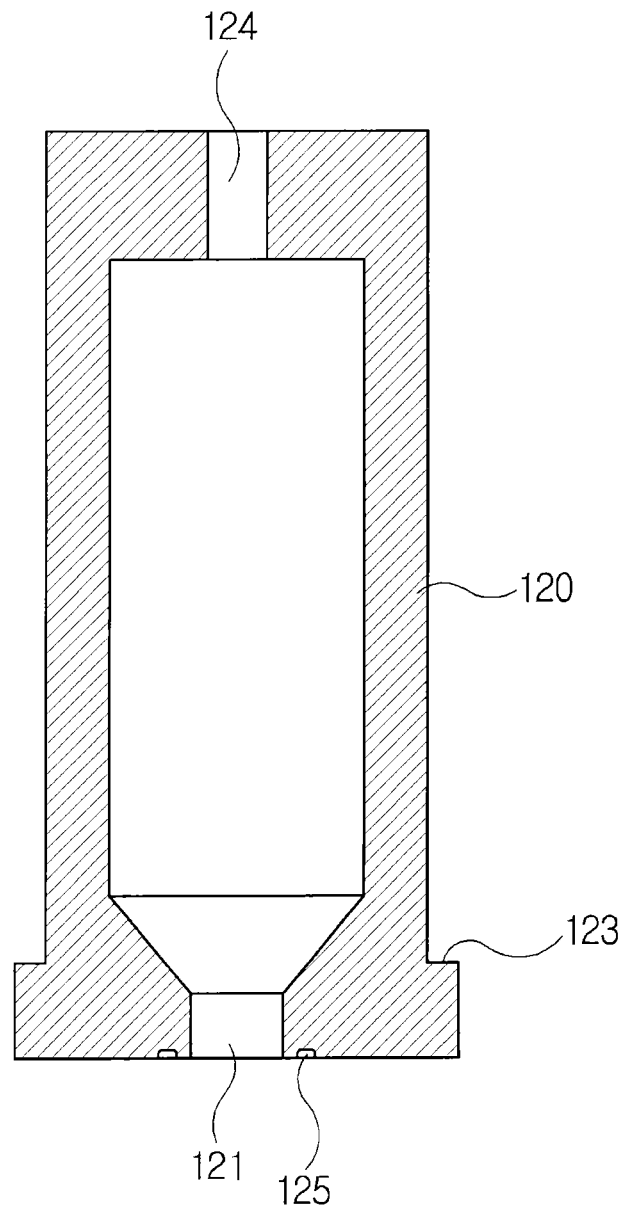
FIG. 3 is a side cross-sectional view of a cylinder of the apparatus for exfoliation of graphene according to the present invention.

As shown in FIGS. 1 to 3, an apparatus for exfoliation of graphene according to an embodiment of the present invention includes a chamber 110, a cylinder 120 which is disposed at an outside of the chamber 110, a clamp 130 which closes an opening 121 of the cylinder 120, and an operation mechanism which operates the clamp 130.

The chamber 110 includes a supporting leg 111 formed at a lower surface thereof, and a through-hole 112 formed in a center portion of an upper surface thereof.

The cylinder 120 is a pressure vessel having an opening 121 formed at a lower surface thereof, which is disposed at an outside of the chamber 110 and in which graphite for producing graphene and a volatile material to be vaporized at room temperature are received. And the cylinder 120 in which the graphite and volatile material are received is installed at the upper surface of the chamber 110 so that the opening 121 is located at a position corresponding to the through-hole 112 of the chamber 110, i.e., the opening 121 is communicated with the through-hole 112. In other words, the cylinder 120 is vertically installed at the upper surface of the chamber 110 so that the opening 121 is directed to a lower side.

Herein, the volatile material to be vaporized at room temperature, which is received in the cylinder 120, may be liquid nitrogen, liquid oxygen, solid carbon dioxide (dry ice), liquid carbon dioxide or the like. If the graphite and volatile material are filled in the cylinder 120, internal pressure of the cylinder 120 is increased due to vaporization of the volatile material. Therefore, after the graphite and volatile material are filled in the cylinder 120, a separate cover 122 may be installed.

The clamp 130 is disposed in the chamber 110 to pass through the through-hole 112 of the chamber 110 and selectively close the opening 121 of the cylinder 120. The clamp 130 is formed into a vertically extended rod shape and coupled with the operation mechanism to be described later. The clamp 130 is moved vertically by the operation mechanism so as to selectively close the opening 121 of the cylinder 120 or selectively press the cover 122 installed at the opening 121. That is, the clamp 130 prevents the opening 121 from being opened by the internal pressure of the cylinder 120, such that the inner portion of the cylinder 120 is maintained at a high pressure due to vaporization of the volatile material.

The operation mechanism is coupled with the clamp 130. And the operation mechanism moves the clamp 130 in a vertical direction so that the clamp 130 closes the opening 121 of the cylinder 120.

More specifically, the operation mechanism includes an operation lever 140 and a link member 150. The operation lever 140 is disposed at an upper side of an outer surface of the chamber 110 so as to be pivoted up and down by a user. The link member 150 is disposed at an upper side of an inner surface of the chamber 110 so that one end of the link member 150 is connected to the operation lever 140 and the other end thereof is connected to the clamp 130.

Herein, the link member 150 includes a first link 151 which is connected with the operation lever 140 and a second link 152 which is connected with the clamp 130. The first and second links 151 and 152 are rotatably connected with each other and supported to a fixing bracket 113 which is installed at an inner upper side of the chamber 110. The second link 152 has an insertion hole which is formed in a vertical direction. The clamp 130 is fixedly inserted into the insertion hole.

By the configuration of the operation mechanism, when the operation lever 140 is pivoted down by a user, the link member 150 is interlocked with the operation lever 140, and then the first link 151 is rotated and the second link 152 is lifted down, and thus the clamp 130 is also lifted down in a vertical direction. Therefore, the clamp 130 which closes the opening 121 of the cylinder 120 or presses down the cover 122 installed at the opening 121 of the cylinder 120 is moved down, and thus the internal pressure of the cylinder 120 is released. Herein, the internal pressure of the cylinder 120 is dropped sharply by the lifting down of the clamp 130, and thus the graphite is expanding suddenly, thereby producing graphene.

As described above, if graphene is produced by using the internal pressure drop of the cylinder 120, it is not necessary to use an acid like sulfuric acid, and it is also not necessary to perform a thermal treatment process for removing sulfuric acid.

Preferably, a jig 160 enclosing the through-hole 112 is provided at an outer upper surface of the chamber 110. One side of the jig 160 which is opposed to the fixing bracket 113 is opened, and a sliding groove is formed in the jig 160. The cylinder 120 is provided with a flange 123 which is slidably inserted into the sliding groove. The cylinder 120 is laterally slid from the opened side of the jig 160 and then fixed to the jig 160.

Meanwhile, the cylinder 120 has an installation hole 124 formed at an end thereof opposed to the end having the opening 121. A pressure gauge (not shown) is disposed in the installation hole 124 in order to measure the internal pressure of the cylinder 120. Therefore, the user can check on the pressure gauge, when the internal pressure of the cylinder 120 is more than a predetermined value the user can operate the operation mechanism in order to release the internal pressure of the cylinder 120.

Further, a ring-shaped seal packing 125 may be provided around the opening 121 of the cylinder 120. The seal packing functions to more tightly seal between the cover 122 and the cylinder 120.

Figure 4:
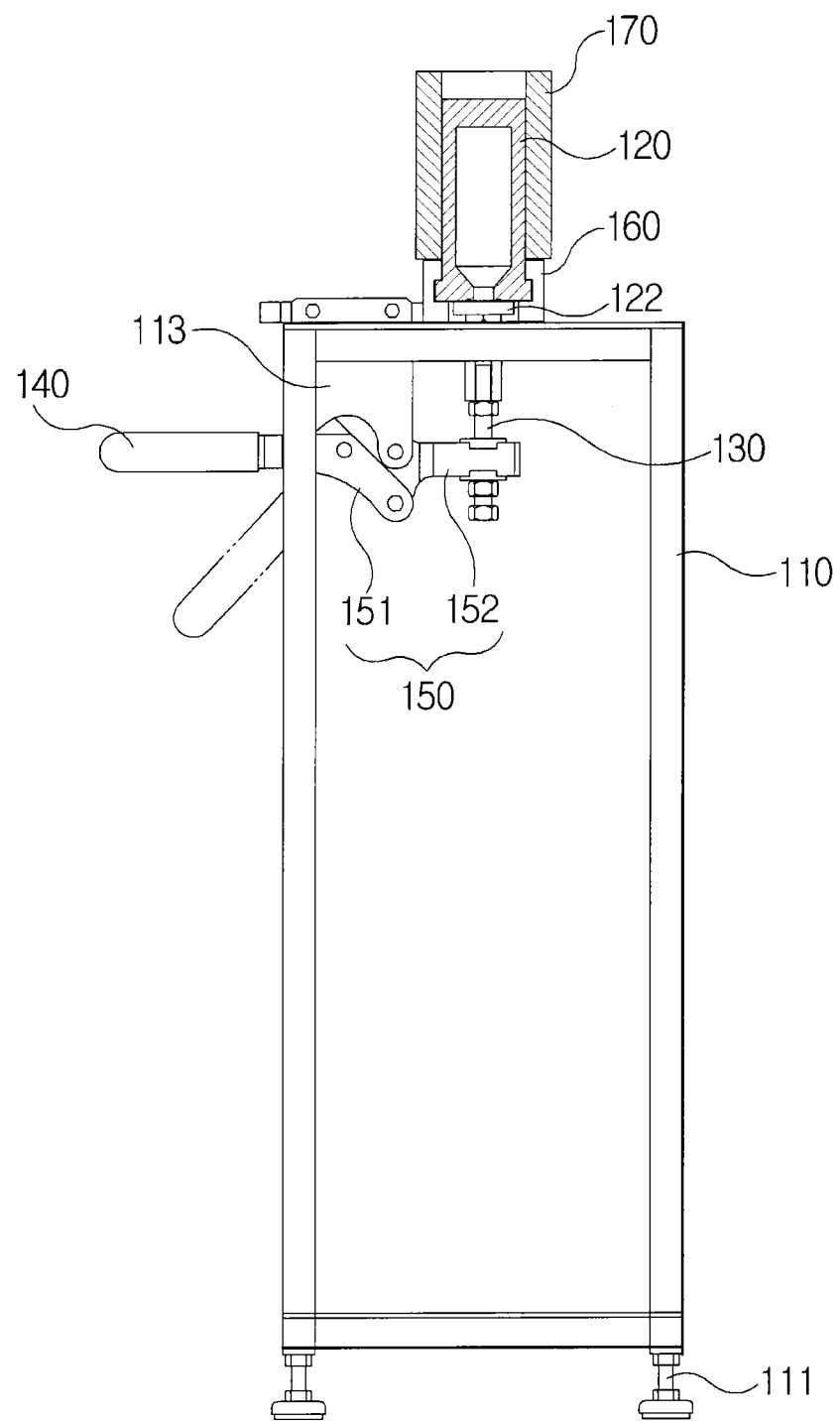
FIG. 4 is a side cross-sectional view of an apparatus for exfoliation of graphene according to another embodiment of the present invention.

Meanwhile, FIG. 4 is a side cross-sectional view of an apparatus for exfoliation of graphene according to another embodiment of the present invention. A heating unit 170 may be provided at an outside of the cylinder 120 in order to heat the cylinder 120 and thus increase an internal temperature of the cylinder 120. Herein, the heating unit 170 may heat the cylinder 120 by induction heating. That is, the heating unit 170 may be an induction coil wrapping the cylinder 120. Further, the heating unit 170 may be a heater which heats the cylinder 120 directly.

If the cylinder 120 is heated by using the heating unit 170 while the cylinder 120 is closed after the graphite and volatile material are filled therein, the internal pressure of the cylinder 120 is more rapidly increased by the internal temperature rise of the cylinder 120.

Herein, instead of the volatile material which is vaporized at room temperature, a material having a boiling point of 200° C. or less may be received in the cylinder 120. For example, the material having a boiling point of 200° C. or less may be water, methanol, ethanol, isopropyl alcohol, acetone, tetrahydrofuran, dimethylacetamide, dimethylformamide, normal hexane, cyclohexane, heptanes, toluene, benzene, ethyl acetate or a mixture thereof.

Therefore, the material having a boiling point of 200° C. or less received in the cylinder 120 is heated by the heating unit 170, thereby increasing the internal pressure of the cylinder 120.

Figure 5:
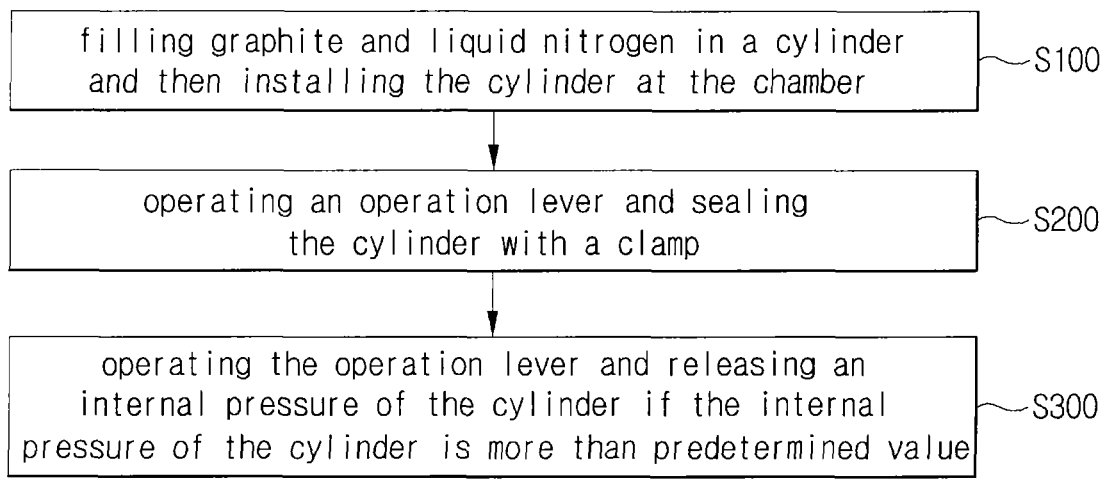
FIG. 5 is a flow chart showing a method for exfoliation of graphene according to an embodiment of the present invention.

FIG. 5 is a flow chart showing a method for exfoliation of graphene according to an embodiment of the present invention. The method for exfoliation of graphene according to the present invention will be described with reference to FIGS. 1 to 5.

First of all, the graphite and volatile material are filled in the cylinder 120, and then the cylinder 120 is installed in the chamber 110 (S100). More detailedly, after removing the cover 122 installed at the opening 121 of the cylinder 120, a desired amount of the graphite and volatile material is filled in the cylinder 120. And the cover 122 is installed at the opening 121 of the cylinder 120 so that the cylinder 120 is air-tightly sealed. Then, the cylinder 120 in which the graphite and volatile material are filled is turned upside down and then installed on the upper surface of the chamber 110. And, the cylinder 120 is horizontally slid to the jig 160 formed on the upper side of the chamber 110, and the flange 123 of the cylinder 120 is mated with the sliding groove of the jig 160 and thus fixed to the upper surface of the chamber 110.

If the cylinder 120 is installed in the jig 160 disposed on the upper surface of the chamber 110, the clamp 130 is moved in order to press upwardly the cover 122 installed at the opening 121 of the cylinder 120, thereby sealing the cylinder 120. This operation is achieved by operating the operation lever 140.

When the operation lever 140 disposed at the outside of the chamber 110 is pivoted upwardly, the link member 150 having the first and second links 151 and 152 is interlocked with the operation lever 140, and thus the clamp 130 is vertically moved upwardly. Then, an upper end of the clamp 130 is contacted with the cover 122 of the cylinder 120, thereby prevented the cover 122 from being opened by the internal pressure of the cylinder 120.

In this situation, if a desired time is elapsed, the volatile material in the cylinder 120 is vaporized and the internal pressure of the cylinder 120 is gradually increased.

Then, if the internal pressure of the cylinder 120 is more than a predetermined value after the pressure gauge installed at the installation hole 124 of the cylinder 120 is checked, the user pivots down the operation lever 140 (S300). Preferably, the predetermined value is 10 bar or more.

If the operation lever 140 is pivoted down, the clamp 130 is vertically moved down by interlocking between the operation lever 140 and the link member 150, and the clamp 130 is spaced apart from the cylinder 120. Therefore, when the clamp 130 is moved down, the force upwardly pressing the cover 122 is released, and the cover 122 is opened by the internal pressure of the cylinder 120.

The internal pressure of the cylinder 120 is released in an instant, and the graphite in the cylinder 120 is suddenly expanded by the momentary pressure drop in the cylinder 120, and the graphite is exfoliated into a plurality of graphenes.

Figure 6:
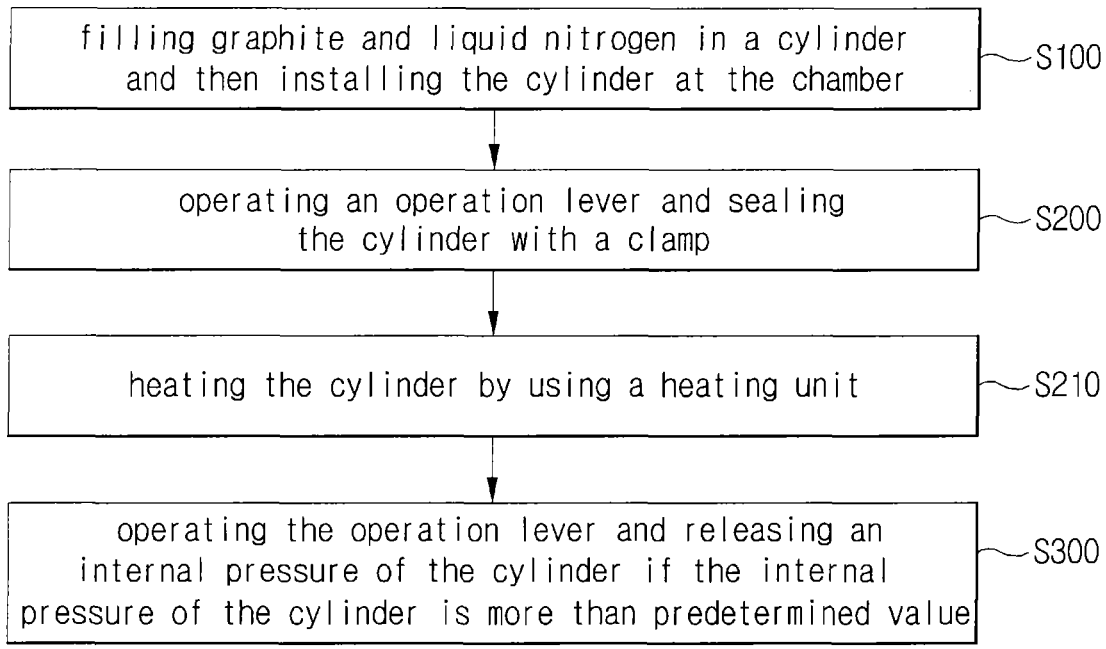
FIG. 6 is a flow chart showing a method for exfoliation of graphene according to another embodiment of the present invention.

Meanwhile, FIG. 6 is a flow chart showing a method for exfoliation of graphene according to another embodiment of the present invention.

After the cylinder 120 in which the graphite and volatile material are filled is sealed, the cylinder 120 can be heated (S210). Herein, the cylinder 120 is heated by the heating unit 170 installed at the upper side of the cylinder 120. If the cylinder 120 is heated by the heating unit 170, the internal pressure of the cylinder 120 is more rapidly increased by the internal temperature rise of the cylinder 120.

As described above, when graphene is produced by using the internal pressure drop of the cylinder 120, it is not necessary to use an acid like sulfuric acid, and it is also not necessary to perform a thermal treatment process for removing sulfuric acid.

According to the present invention, it is possible to simplify the manufacturing process, as compared with the conventional method, reduce the manufacturing cost and also prevent the properties of graphene from being deteriorated by the thermal treatment process at a high temperature.

While the present invention has been described with respect to the specific embodiments, it will be apparent to those skilled in the art that various changes and modifications may be made without departing from the spirit and scope of the invention as defined in the following claims.

What is claimed is:

1. An apparatus for exfoliation of graphene, comprising:
    a chamber which has a through-hole formed at one surface thereof;
    a cylinder which receives graphite and a volatile material to be vaporized at room temperature and has an opening corresponding to the through-hole of the chamber, and which is mounted at an outside of the chamber, said cylinder having a flange at the lower end thereof;
    a clamp to vertically move inside the chamber so as to pass through the through-hole of the chamber and thus selectively seal the opening of the cylinder;
    an operation mechanism which is connected with the clamp and vertically moves the clamp so that the opening of the cylinder is selectively sealed by the clamp; and
    a jig outside of the chamber to enclose the through-hole, said jig having a lateral slot therein to slidably receive the flange of said cylinder.

2. The apparatus of claim 1, wherein the operation mechanism comprises an operation lever which is installed at an outside of the chamber, and a link member which is connected between the operation lever and the clamp in the chamber so as to move the clamp through operation of the operation lever.

3. The apparatus of claim 2, wherein the cylinder is vertically installed on an upper surface of the chamber, and the clamp is interlocked with the link member through operation of the operation lever and then moved vertically.

4. The apparatus of claim 1, wherein the cylinder has an installation hole formed at an end thereof opposed to an end having the opening, and a pressure gauge for measuring the internal pressure of the cylinder is installed in the installation hole.

5. The apparatus of claim 1, wherein a seal packing is provided around the opening of the cylinder.

6. The apparatus of claim 1, wherein the volatile material is liquid nitrogen, liquid oxygen, solid carbon dioxide (dry ice) or liquid carbon dioxide.

7. An apparatus for exfoliation of graphene, comprising:
    a chamber which has a through-hole formed at one surface thereof;
    a cylinder which receives graphite and a material having a boiling point of 200° C. or less and has an opening to be corresponding to the through-hole of the chamber, and which is disposed at an outside of the chamber;
    a clamp which is vertically movable in the chamber so as to pass through the through-hole of the chamber and thus selectively seal the opening of the cylinder;
    an operation mechanism which is connected with the clamp and vertically moves the clamp so that the opening of the cylinder is selectively sealed by the clamp;
    a heating unit which heats the cylinder; and
    a jig which is provided at an outside of the chamber to enclose the through-hole, and which laterally and slidably receives the cylinder.

8. The apparatus of claim 7, wherein the material having a boiling point of 200° C. or less is water, methanol, ethanol, isopropyl alcohol, acetone, tetrahydrofuran, dimethylacetamide, dimethylformamide, normal hexane, cyclohexane, heptanes, toluene, benzene, ethyl acetate or a mixture thereof.

* * * * *